United States Patent
Hisatake et al.

(10) Patent No.: US 10,384,420 B2
(45) Date of Patent: Aug. 20, 2019

(54) HEAT-INSULATION MATERIAL AND PRODUCTION METHOD THEREOF

(71) Applicant: Panasonic Intellectual Property Management Co., Ltd., Osaka (JP)

(72) Inventors: Yoichi Hisatake, Osaka (JP); Shinji Okada, Osaka (JP); Shigeaki Sakatani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 212 days.

(21) Appl. No.: 15/424,542

(22) Filed: Feb. 3, 2017

(65) Prior Publication Data

US 2017/0239914 A1 Aug. 24, 2017

(30) Foreign Application Priority Data

Feb. 18, 2016 (JP) ................. 2016-028456

(51) Int. Cl.
*B32B 5/26* (2006.01)
*B32B 5/02* (2006.01)
(Continued)

(52) U.S. Cl.
CPC .............. *B32B 5/26* (2013.01); *B32B 5/02* (2013.01); *B32B 5/022* (2013.01); *B32B 5/145* (2013.01);
(Continued)

(58) Field of Classification Search
CPC .......................... B32B 5/022; B32B 5/26; B32B 5/145; B32B 2266/126
See application file for complete search history.

(56) References Cited

U.S. PATENT DOCUMENTS

| 5,744,021 A | 4/1998 | Brungs et al. |
| 2002/0025427 A1 | 2/2002 | Schwertfeger et al. |

(Continued)

FOREIGN PATENT DOCUMENTS

| CN | 1205751 A | 1/1999 |
| EP | 2281961 A1 | 2/2011 |

(Continued)

OTHER PUBLICATIONS

The Extended European Search Report dated Jun. 8, 2017 for the related European Patent Application No. 17153403.5.

(Continued)

*Primary Examiner* — Hai Vo
(74) *Attorney, Agent, or Firm* — Panasonic IP Management; Kerry S. Culpepper

(57) ABSTRACT

A heat-insulation material, includes: a first substrate layer that includes an aerogel and first fibers; and a second substrate layer that is layered on the first substrate layer and that includes an aerogel and second fibers, wherein a volume density of the aerogel in the first substrate layer is larger than a volume density of the aerogel in the second substrate layer, and an amount of the aerogel that is present around a first surface of the second substrate layer inside the second substrate layer, not adjacent to the first substrate layer, is smaller than an amount of the aerogel that is present around a second surface (inside the second substrate layer adjacent to the first substrate layer.

7 Claims, 4 Drawing Sheets

(51) Int. Cl.
  *B32B 5/14* (2006.01)
  *B32B 5/18* (2006.01)
  *B32B 37/14* (2006.01)

(52) U.S. Cl.
  CPC .............. *B32B 5/18* (2013.01); *B32B 37/144* (2013.01); *B32B 2250/03* (2013.01); *B32B 2250/20* (2013.01); *B32B 2250/40* (2013.01); *B32B 2255/02* (2013.01); *B32B 2255/20* (2013.01); *B32B 2260/023* (2013.01); *B32B 2260/04* (2013.01); *B32B 2264/10* (2013.01); *B32B 2266/126* (2016.11); *B32B 2307/304* (2013.01); *B32B 2307/722* (2013.01); *B32B 2307/73* (2013.01); *B32B 2419/00* (2013.01); *B32B 2419/02* (2013.01); *B32B 2457/00* (2013.01); *B32B 2457/04* (2013.01)

(56) References Cited

U.S. PATENT DOCUMENTS

| | | | |
|---|---|---|---|
| 2002/0094426 A1* | 7/2002 | Stepanian | B01J 13/0091 428/292.1 |
| 2014/0287641 A1 | 9/2014 | Steiner, III | |
| 2017/0210108 A1* | 7/2017 | Mihalcik | B32B 5/02 |

FOREIGN PATENT DOCUMENTS

| | | |
|---|---|---|
| JP | 2001-509097 | 7/2001 |
| JP | 2009-299893 | 12/2009 |
| WO | 2015/016730 A2 | 2/2015 |

OTHER PUBLICATIONS

English Translation of Chinese Search Report dated Aug. 10, 2018 for the related Chinese Patent Application No. 201710066415.2.

* cited by examiner

PRIOR ART

HEAT-INSULATION MATERIAL AND PRODUCTION METHOD THEREOF

TECHNICAL FIELD

The technical field relates to a heat-insulation material and a production method thereof. In particular, the technical field relates to a heat-insulation material having a multi-layer structure, and a production method thereof.

BACKGROUND

In recent years, with high functionalization of electronic devices such as smartphones, tablets, and notebook computers, densities of heat generation from heat-generating components have drastically increased. Therefore, heat-insulation technologies have been indispensable, for such electronic devices.

In particular, small-sized mobile devices have many occasions to come into direct contact with human bodies, and increases in temperatures of external surfaces of their casing have been serious problems. As one example of problems caused by such increases in temperatures of external surface of casings of mobile devices, low-temperature burn injuries are a type of burn injury caused by long-term exposure of the human body to a temperature higher than the body temperature. There has been a report that, when the temperature is 44° C., burn injuries will occur in 6 hours, and that the time required to result in the burn injuries will be shortened to half of it by an increase of 1° C. Compared with usual burn injuries, in most cases of low temperature burn injuries, injured persons take longer to notice the progression of the symptoms. When the injured persons eventually notice the injuries, they have already received serious skin damages in most cases.

Moreover, liquid crystal or organic EL displays are used for display elements of mobile devices. However, these display elements are weak to heat, and, if heat from heat-generating components transmits to the display elements, this becomes a factor that causes uneven brightness or reduced durable life of the displays. Therefore, in order to satisfy both of high performance and reduced size/thickness of the mobile devices, it is required that the heat transmission to the display elements is effectively reduced.

Furthermore, recently, there are many cases where low temperature burns injuries occur when small-sized notebook computers are used on the knees for a long time. In a state where downsizing of devices, and development of their mobile forms will be increasingly progressed in the days ahead, it is a most important issue to keep the temperature of the surface of the devices as low as possible even by 1° C.

Additionally, miniaturization, thinning, and high functionalization of appliances such as audio visual equipment (e.g. televisions, recorders, and audio instruments), white goods (e.g. air conditioners and washing machines), and electric tools (e.g. electric screwdrivers) have growingly progressed. These appliances also have occasions to come into contact with human bodies, and therefore, there is an increasing need for suppression of heat transmission to external surfaces of the casings.

Furthermore, with regard to residential building materials, there is an increasing need for thinning of walls, and narrowing of piping routes in association with expansion of indoor spaces. Even when walls are thin, heat-insulation performance of rooms must be maintained. Therefore, it is required to block the outside cool or warm air. Heat insulation is required also in order to prevent dew formation on/in pipes. In addition, in cases where hot water flows through pipes, heat insulation is required in the pipes.

As one example of a method for blocking the heat to solve the above problems, use of heat-insulation members in the electronic devices or home electric appliances can be considered in order to prevent the heat from heat-generating components inside casings of the devices or appliances from transferring to the casings. Also, use of heat-insulation members is considered to block the heat in the field of residential building materials. Furthermore, in order to fulfill these demands, there has been an increasing demand for realization of thin and flexible heat-insulation materials.

As one example of a heat-insulation member that satisfies the above demand, a sheet-shaped heat-insulation material that is obtained by causing a substrate such as unwoven fabrics to contain a highly-heat-insulative aerogel can be mentioned. However, when such a heat-insulation sheet based on an aerogel is used as a heat-insulation material, the sheet cannot be adhered to a desired location since the aerogel is adhered onto surfaces of the sheet. To solve this problem, there is a structure shown by a cross-section diagram of FIG. 8 (JP-A-2009-299893, JP-T-2001-509097, etc.). In the structure, a surface of an aerogel layer 101 is covered with a covering layer 102.

SUMMARY

However, the above conventional structure has a problem in which the heat conductivity will be high due to the presence of the covering layer 102, and therefore, the disclosed material is unsuitable as a heat-insulation material. That is, the covering layer 102 that covers the entire body is not preferable.

The disclosure solves the above problem in the conventional arts, and the purpose of the disclosure is to provide a heat-insulation sheet that makes it possible to attach an adhesive or adherent material onto a part of the surface of the heat-insulation sheet, and a production method thereof.

In order to achieve the above-mentioned purpose, provided is a heat-insulation material, including: a first substrate layer that includes an aerogel and first fibers; and at least one second substrate layer that is layered on the first substrate layer and that includes an aerogel and second fibers, wherein a volume density of the aerogel in the first substrate layer is larger than a volume density of the aerogel in the at least one second substrate layer, and an amount of the aerogel that is present around a surface (i) of the second substrate layer inside the second substrate layer, said surface (i) not being adjacent to the first substrate layer, is smaller than an amount of the aerogel that is present around a surface (ii) of the second substrate layer inside the second substrate layer, said surface (ii) being adjacent to the first substrate layer.

Moreover, provided is a method for producing a heat-insulation material, including: supplying an aerogel solution only to a first substrate layer in a laminate in which the first substrate layer including first fibers, and a second substrate layer including second fibers are layered; and drying the laminate.

Furthermore, provided is a method for producing a heat-insulation material, including: supplying an aerogel solution to a first substrate layer including first fibers; layering the first substrate layer and a second substrate layer including second fibers to produce a laminate; and drying the laminate.

The heat-insulation material according to the disclosure makes it possible to attach an adhesive or adherent material onto a part of the surface of the heat-insulation sheet.

DESCRIPTION OF EMBODIMENTS

Hereinafter, embodiments of the disclosure will be described with reference to the drawings.

First Embodiment

Figure 1:
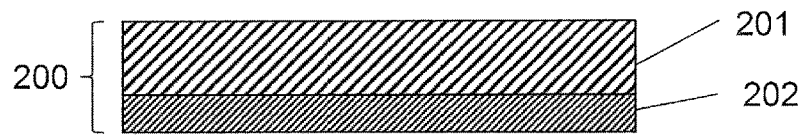
FIG. 1 is a diagram that shows a structure of a bilayer heat-insulation sheet according to a first embodiment of the disclosure.

FIG. 1 a diagram that shows a structure of the heat-insulation material according to the first embodiment of the disclosure.

In FIG. 1, a heat-insulation sheet 200 is a laminate of a first substrate layer 201 and a second substrate layer 202.

In FIG. 1, the first substrate layer 201 includes an aerogel, and first fibers that are completely filled with the aerogel. The state in which the first fibers are completely filled with the aerogel refers to a state in which the air that had been contained between the first fibers is replaced with the aerogel. In cases where the resulting product is used as a heat-insulation material, a volume density of the aerogel is preferably 90% or more of the entire volume of the first substrate layer 201. However, even if the volume density is less than 90% of the entire volume, the resulting product can be used as a heat-insulation material, although the heat-insulation performance may be relatively lower. The heat-insulation performance of the first substrate layer 201 will be determined by the volume density of the aerogel.

The second substrate layer 202 includes an aerogel, and second fibers that are not completely filled with the aerogel. The state in which the second fibers are not completely filled with the aerogel refers to a state in which the aerogel had not been able to penetrate into the second fibers, and the air has remained between the second fibers. A volume density of the aerogel is preferably 30 vol % or less of the second substrate layer 202. If the volume density of the aerogel is larger than 30 vol %, a proportion of the aerogel that adheres onto the lower face (surface) of the second substrate layer 202 will be higher, and thus, the adhesion performance may be impaired.

Within the lower side of the second substrate layer 202, i.e. the surface of the second substrate layer 202 that does not face the first substrate layer 201, a proportion of an area onto which the aerogel adheres is preferably 5% or less in terms of sufficient adhesiveness. Even in cases where the proportion is larger than 5%, adhesiveness will be present. However, the proportion is preferably 5% or less. With regard to a distribution of the aerogel in the second substrate layer 202, a distribution in which the aerogel is the most intensively present around the boundary face between the first and second substrate layers 201 and 202, and the volume density of the aerogel becomes smaller towards the opposite face is adopted. The volume density of the aerogel in the entire of the second substrate layer 202 is preferably 30 vol % or less, and a proportion of the area within the lower face where the aerogel is present is preferably 5% or less.

It becomes possible to attach a material used for adhesion (e.g. adhesives, adherent materials, tapes) to a lower face of the second substrate layer 202 onto which only a small amount of the aerogel is adhered. Accordingly, it further becomes possible to easily apply the heat-insulation sheet 200, containing an aerogel with excellent heat-insulation properties, onto a desired location.

Types of the first fibers in the first substrate layer 201 and the second fibers in the second substrate layer 202 may be the same or different. However, their shapes, bulk densities, etc. are different from each other as described below.

An example of a property list that describes differences in properties between the first substrate layer 201 and the second substrate layer 202 is shown in Table 1. The unit weights refer to unit weights of the first fibers in the first substrate layer 201 and the second fibers in the second substrate layer 202.

TABLE 1

| Substrates | Unit weights (Bulk densities) | Water repellency treatment |
|---|---|---|
| First substrate layer 201 | 0.04 g/cm$^3$ or less | No |
| Second substrate layer 202 | 0.1 g/cm$^3$ or more | Yes |

When a larger amount of the aerogel is included in the first fibers in the first substrate layer 201, the heat-insulation performance will be higher. That is, when fibers having the same thickness are compared, fibers having a smaller unit weight can include a larger amount of the aerogel, and therefore, such fibers will deliver higher heat-insulation performance.

However, if the thickness of fibers changes, their unit weight also changes. Therefore, it is considered that a unit weight per unit thickness is calculated. When a bulk density that is calculated as unit weight [g/m$^2$]/thickness [mm] is obtained, fibers having a bulk density of 0.04 g/cm$^3$ or less are preferable for the first fibers in the first substrate layer 201. This is because, when the bulk density is 0.04 g/cm$^3$ or less, the heat conductivity that serves as an index for heat-insulation performance will be lower than 26 mW/mK, which corresponds to the heat conductivity of the air, and sufficient heat-insulation performance can be secured.

A lower limit for the bulk density is preferably 0.01 g/cm$^3$ or higher in order to secure sufficient strength.

On the other hand, the second substrate layer 202 has properties different from those of the first substrate layer 201. A unit weight of the second fibers in the second substrate layer 202 is larger than that of the first fibers, and fibers having a larger bulk density are preferable therefor. This is because, if the unit weight is larger, an amount of the air included in the fibers will be smaller, and the aerogel hardly penetrates into the second substrate layer 202. In consideration of heat-insulation performance of the entire heat-insulation sheet 200, the thickness of the second substrate layer 202 that contains a smaller amount of the aerogel is preferably as small as possible since the heat-insulation performance of the entire heat-insulation sheet 200 will be higher. The thickness is preferably 0.1 mm or smaller since the heat-insulation performance will be higher than the air.

However, there will be ho problem even when the thickness is larger than 0.1 mm. The bulk density, which corresponds to a unit weight per unit thickness, is preferably 0.1 g/cm$^3$ or more. When the bulk density is 0.1 g/cm$^3$ or more, the amount of the aerogel that penetrates into the first substrate layer 201 will be less than 30 vol %, and therefore, it becomes possible to limit the amount of the aerogel adhering on the lower face of the second substrate layer 202 to 5 vol % or less.

An upper limit for the bulk density is preferably 0.12 g/cm$^3$ or less to realise appropriate penetration of the aerogel and appropriate heat conductivity.

Furthermore, water repellency, which is a property different from the above-mentioned unit weight, may be imparted to the second fibers in the second substrate layer 202. Water repellency may be imparted to the second fibers through UV washing, plasma washing, or the like. When the water repellency treatment is carried out, the aerogel can be prevented from penetrating into the second substrate layer 202. Accordingly, even if the unit weight of the second fibers is set to be smaller, the aerogel cannot penetrate into the second fibers due to the water repellency treatment, and therefore, it becomes possible to use second fibers having a bulk density of less than 0.1 g/cm$^3$. In that case, water repellency is not imparted to the first substrate layer 201. If water repellency is imparted thereto, the aerogel cannot penetrate into the first substrate layer 201, and the resulting product cannot be used for the purpose of a heat-insulation material.

The first fibers in the first substrate layer 201 at least have water repellency lower than the second fibers in the second substrate layer 202.

Water repellency may be imparted to the second fibers before the first fibers in the first substrate layer 201 and the second fibers in the second substrate layer 202 are adhered to each other. The water repellency-imparting treatment is carried out with respect to the entire of the second fibers in the second substrate layer 202. In particular, the surfaces of the second fibers are preferably homogenously imparted with water repellency. Then, the first fibers for the first substrate layer 201 and the second fibers for the second substrate layer 202 can be adhered to each other based on a needle punch method or the like which corresponds to a method for adhering non-woven fabrics to each other to produce a composite material.

<First Production Method>

The aerogel may be prepared in the following way. A gel material, i.e. water glass or a metal alkoxide such as tetramethoxysilane, a solvent such as water or an alcohol, and a catalyst as needed are mixed. In this way, a wet gel is prepared from the gel material in the solvent. Then, the solvent inside the gel is evaporated, to produce an aerogel. Therefore, the material itself is in a liquid state.

Figure 2:
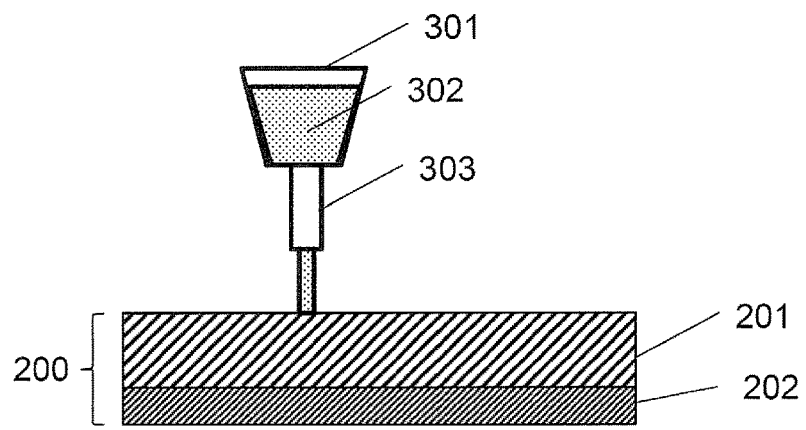
FIG. 2 is a diagram that shows a first impregnation method for production of the bilayer heat-insulation sheet according to the first embodiment of the disclosure.

FIG. 2 is a cross-section diagram that shows the first method for coating a material 302 for an aerogel onto fibers to impregnate the fibers with the material 302. A coating head 301 is filled with the material 302. The material 302 that has been discharged from a coating nozzle 303 is impregnated into first fibers in the first substrate layer 201. However, since the unit weight of the second fibers in the second substrate layer 202 is larger than the unit weight of the first fibers in the first substrate layer 201, the material 302 is less likely to impregnate into the second substrate layer 202. The material 302 will be distributed around the upper face of the second substrate layer 202 that faces the first substrate layer 201. Accordingly, the material 302 does not reach the lower face of the second substrate layer 202. Eventually, this leads to the volume density of the aerogel mentioned above.

<Second Production Method>

Figure 3:
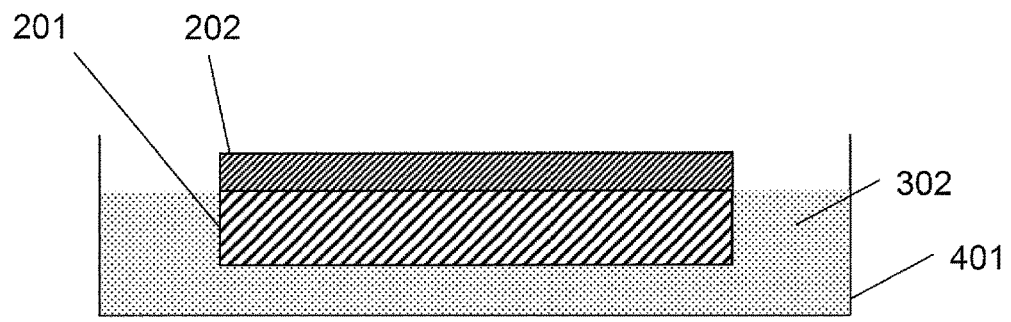
FIG. 3 is a diagram that shows a second impregnation method for production of the bilayer heat-insulation sheet according to the first embodiment of the disclosure.

FIG. 3 is a cross-section diagram that shows the second impregnation method for impregnating the fibers with a material 302 for an aerogel by way of soaking. A soaking bath 401 is filled with the material 302. Only the first fibers in the first substrate layer 201 are preferably soaked therein. Preferably, the second substrate layer 202 is not soaked in the material 302 in order to prevent even a small amount of the aerogel from adhering on the surface of the second substrate layer 202. After completion of soaking, the composite material is taken out of the soaking bath 401, and the impregnated material 302 is gelatinized. A part of the material 302 moves from the first substrate layer 201 to the second substrate layer 202. Eventually, this leads to the volume density of the aerogel mentioned above.

<Third Production Method>

Figure 4:
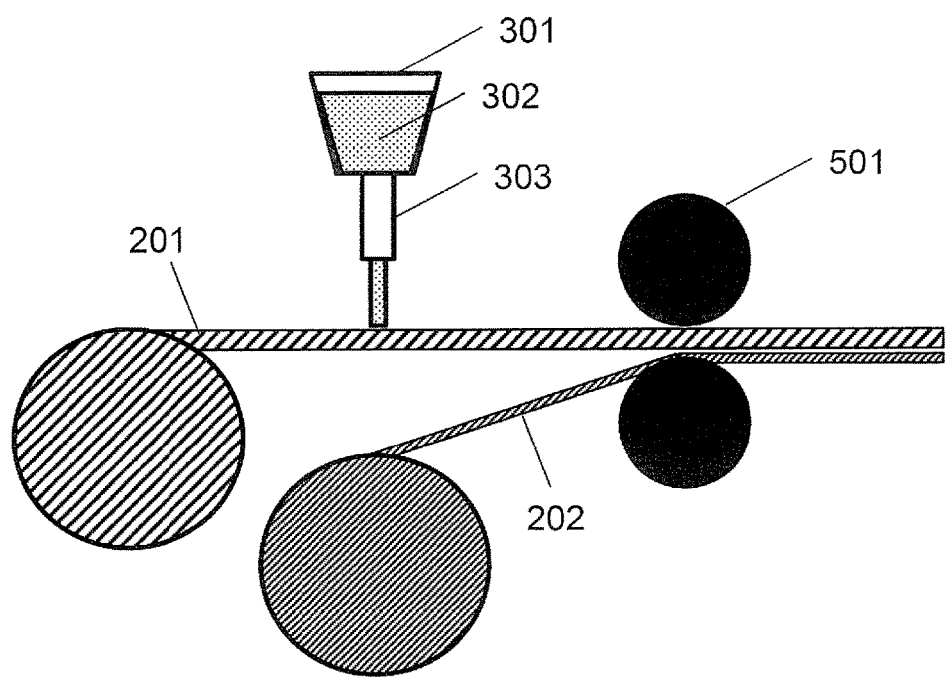
FIG. 4 is a diagram that shows an example of production of the bilayer heat-insulation sheet according to the first embodiment of the disclosure.

FIG. 4 shows the third method in which a material 302 for the aerogel is impregnated into the first substrate layer 201, and then, the first substrate layer 201 is adhered onto the second substrate layer 202 to produce a heat-insulation sheet. A coating head 301 is filled with the material 302. The material 302 that has been discharged from a coating nozzle 303 is impregnated into first fibers in the first substrate layer 201.

Then, the first fibers in the first substrate layer 201 and second fibers in the second substrate layer 202 are layered. Then, the first substrate layer 201 and the second substrate layer 202 are combined by a roller 501. After they are combined, the material 302 is gelatinised in that state, and it comes into a state in which the first substrate layer 201 and the second substrate layer 202 are joined. Actually, the material 302 is gelatinized in a state that the material 302 that comes out of the first substrate layer 201 adheres onto the outermost layer of the second substrate layer 202, and therefore, it becomes possible to join the first and second substrate layers 201 and 202 due to binding force of the gel. The material 302 in the first substrate layer 201 penetrates into the second substrate layer 202.

Consequently, the aerogel is distributed in the second substrate layer 202 of the heat-insulation sheet 200 in such a manner that a content of the aerogel becomes smaller towards the direction from the surface of the second substrate layer 202, the surface being adjacent to the first substrate layer 201, to the surface of the second substrate layer 202, the surface not being adjacent to the first substrate layer 201. As a result of this, an area of the surface of the second substrate layer 202 on which the aerogel is present will be 5% or less.

Second Embodiment

<Structure>

Figure 5:
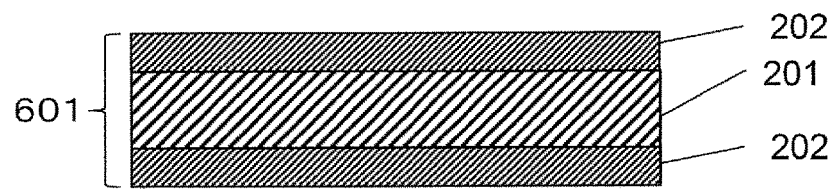
FIG. 5 is a diagram that shows a structure of a trilayer heat-insulation sheet according to a second embodiment of the disclosure.

A trilayer heat-insulation sheet 601 shown in FIG. 5 has a trilayer structure in which a first substrate layer 201 is placed between two pieces of second substrate layers 202. In this case, since both sides of the trilayer heat-insulation sheet 601 are formed by the second substrate layers 202, materials for adhesion, (e.g. adherent materials, adhesives, and tapes) can be applied onto both sides of the trilayer heat-insulation sheet 601, and therefore, a range of application of the heat-insulation sheet 601 will further be broadened.

<Fourth Production Method>

Figure 6:
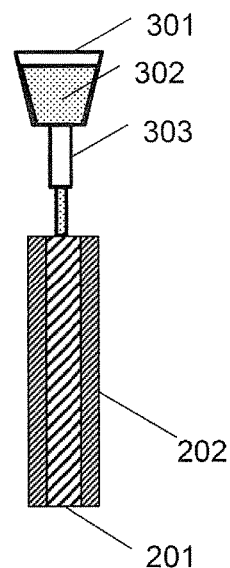
FIG. 6 is a diagram that shows a first impregnation method for production of the trilayer heat-insulation sheet according to the second embodiment of the disclosure.

FIG. 6 is a diagram that snows a method for impregnation of a material 302 for the aerogel to produce the above trilayer heat-insulation sheet 601. For coating of the material, it is required that the material 302 is impregnated directly into the first substrate layer 201 that is a middle layer among the three layers. Therefore, preferably, in a state where the heat-insulation sheet 601 is caused to stand vertically, the material 302 is coated onto one side of the heat-insulation sheet 601, and the material 302 is impregnated into the heat-insulation sheet 601 by gravity.

<Fifth Production Method>

Figure 7:
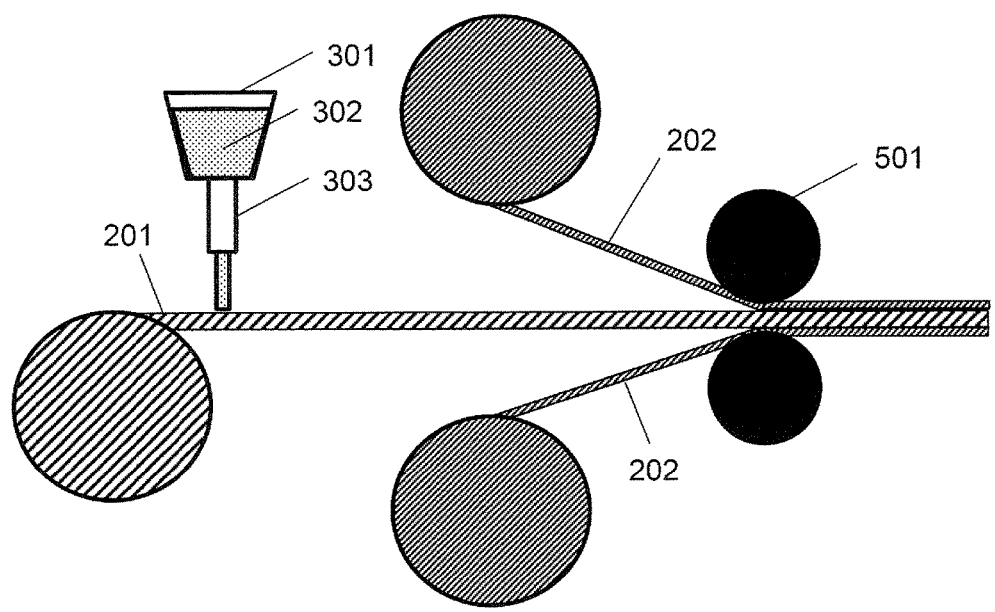
FIG. 7 is a diagram that shows an example of production of the trilayer heat-insulation sheet according to the second embodiment of the disclosure.
Figure 8:
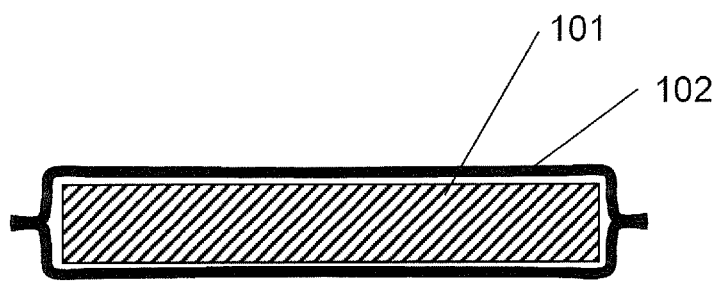
FIG. 8 is a cross-section diagram that shows a structure of the heat-insulation material disclosed in JP-A-2009-299893.

FIG. 7 is a diagram that shows a method in which a material 302 for an aerogel is impregnated into the first substrate layer 201, and then, the first substrate layer 201 is adhered onto the second substrate layer 202 to produce a heat-insulation sheet. A coating head 301 is filled with the material 302. The material 302 that has been discharged from a coating nozzle 303 is impregnated into the first substrate layer 201. Then, the first substrate layer 201 is placed between the second substrate layers 202 to thereby layer the three layers, and these layers are joined by a joining roller 501 to produce a heat-insulation sheet.

Heat-insulation sheets according to the disclosure are aerogel-based heat-insulation materials that can be adhered to desired objects or locations with adhesives or adherent materials and that deliver excellent heat-insulation performance, and can be used for various purposes that require heat-insulation materials.

What is claimed is:

1. A heat-insulation material, comprising:
   a first substrate layer that includes an aerogel and first fibers; and
   at least one second substrate layer that is layered on the first substrate layer and that includes an aerogel and second fibers, wherein
   a volume density of the aerogel in the first substrate layer is larger than a volume density of the aerogel in the at least one second substrate layer, an amount of the aerogel that is present on a first surface of the at least one second substrate layer not being adjacent to the first substrate layer is smaller than an amount of the aerogel that is present on a second surface of the at least one second substrate layer being adjacent to the first substrate layer, and
   the first fibers and the second fibers are made of the same material, and the second fibers are surface-treated to be water repellent,
   wherein the first fibers are not surface-treated to be water repellant.

2. The heat-insulation material according to claim 1, wherein the aerogel in the at least one second substrate layer is distributed in such a manner that a content of the aerogel becomes smaller towards a direction from the second surface to the first surface.

3. The heat-insulation material according to claim 1, wherein the at least one second substrate layer includes two second substrate layers, and the first substrate layer is placed between the two second substrate layers.

4. The heat-insulation material according to claim 1, wherein the first fibers have a bulk density lower than a bulk density of the second fibers.

5. The heat-insulation material according to claim 1, wherein the first fibers have a bulk density of 0.01 $g/cm^3$ or more and 0.04 $g/cm^3$ or less.

6. The heat-insulation material according to claim 1, wherein the second fibers have a bulk density of 0.1 $g/cm^3$ or more and 0.12 $g/cm^3$ or less.

7. The heat-insulation material according to claim 1, wherein an existing area of the aerogel defined by a proportion of an area onto which the aerogel adheres on the second surface of the at least one second substrate layer facing the first substrate layer side is 5% or less.

* * * * *